July 18, 1950 P. J. CAMPBELL 2,515,861
DAMPED BEARING SUPPORT
Filed June 29, 1945
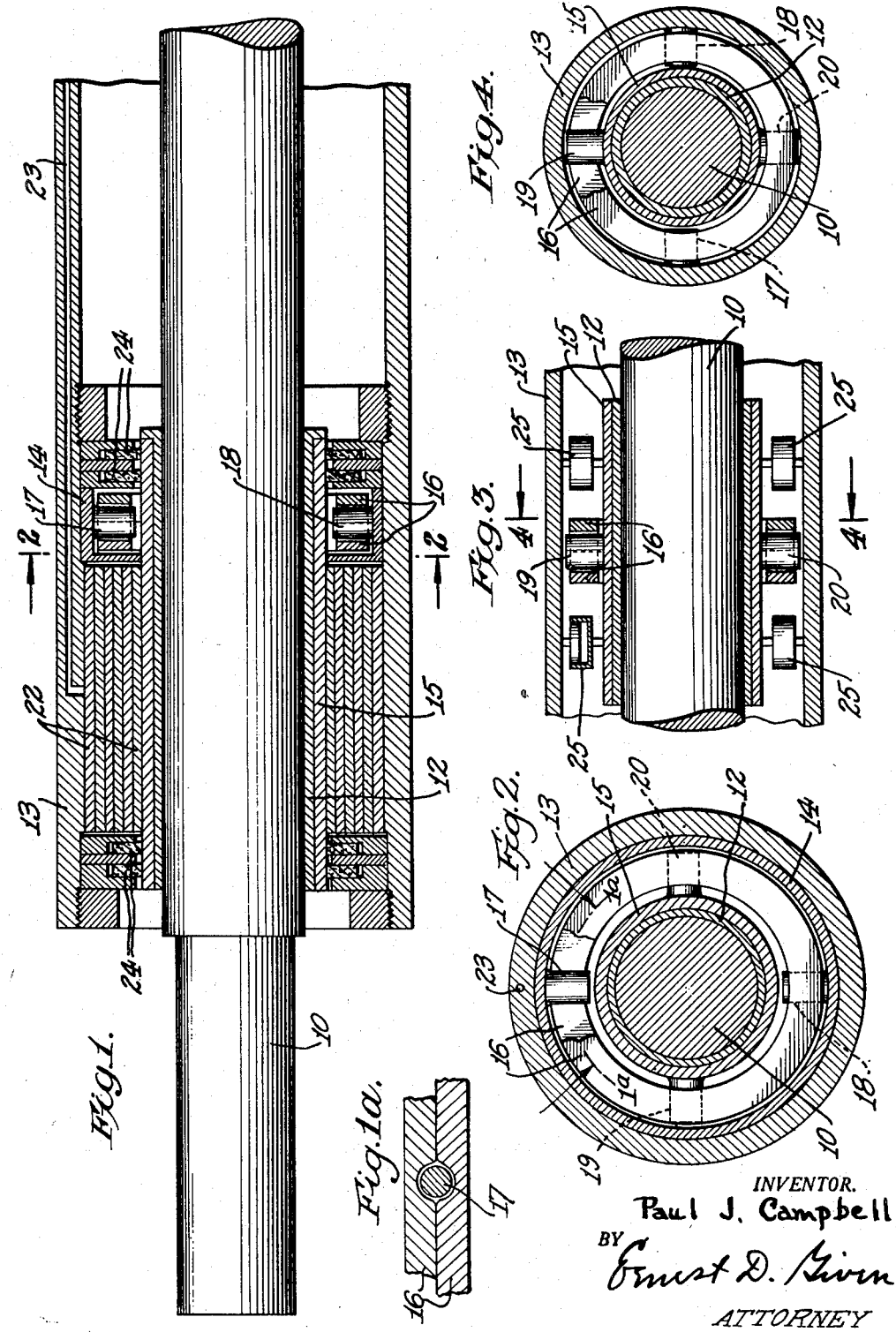
INVENTOR.
Paul J. Campbell
BY Ernest D. Given
ATTORNEY

Patented July 18, 1950

2,515,861

UNITED STATES PATENT OFFICE 2,515,861

DAMPED BEARING SUPPORT

Paul J. Campbell, East Hartford, Conn., assignor to United Aircraft Corporation, East Hartford, Conn., a corporation of Delaware Application June 29, 1945, Serial No. 602,295

5 Claims. (Cl. 308—26)

This invention relates to bearing supports for rotatable shafts and the like, and has for its object to provide a novel and improved device of this type.

Another object of the invention is to provide an improved means for supporting the bearing of a rotating member and for effectively damping said member against vibration.

Still another object is to provide a universal bearing support having means for damping vibrations of a shaft with respect to another member such as a stationary housing or another concentric shaft having a different natural frequency of vibration.

Various other objects and advantages will be apparent as the nature of the invention is more fully disclosed.

The invention resides in a novel means for supporting a shaft bearing in such a way that the bearing may move or rotate within limits in certain directions, thereby permitting damping of the shaft in those directions. My improved damped support is particularly useful in situations where it is impracticable to make either the shaft or its supporting members stiff enough to raise their natural frequencies above the operating speed of the shaft. Aircraft propellers, supercharger impellers, and textile spindles on long overhanging shafts, are typical examples of such situations.

In order to run such shafts above the natural frequency of the combined shaft-support system it is necessary to provide damping as the speed is being increased through the critical range. The necessary damping is accomplished by making use of the principle that a shaft tends to vibrate only at its natural frequency and will resist motion due to forces applied at higher or lower frequencies. In carrying out the invention, the shaft and its supporting system are so designed that their individual natural frequencies are not equal. A bearing is located between the shaft and the supporting system in such a way that it is restrained from rotating with the shaft but is free to move with the shaft in any direction within a plane perpendicular to the shaft, and a damping means is placed between the bearing and the supporting system.

When the rotational velocity of the shaft happens to coincide with the natural frequency thereof, the shaft would be free to vibrate with unlimited amplitude if it were not for the restraint imposed by the bearing as it moves the damper with respect to the supporting system. Similarly, when the shaft is rotating at the natural frequency of the supporting system, any tendency of said system to vibrate is resisted by the shaft through the damper. The present invention provides a simple and efficient means for mounting the bearing in the supporting system in such a way that the desired freedom and restraint are achieved.

Although the novel features which are characteristic of this invention are set forth more in detail in the claims appended hereto, the nature and scope of the invention may be better understood by referring to the following description, taken in connection with the accompanying drawing forming a part thereof, in which certain specific embodiments have been set forth for purposes of illustration.

In the drawing:

Figure 1 is a longitudinal sectional view of a damped bearing support embodying the invention;

Fig. 1a is a fragmentary view in section taken substantially on the curved line 1a—1a of Fig. 2;

Fig. 2 is a transverse section taken on line 2—2 of Fig. 1;

Fig. 3 is a longitudinal sectional view illustrating a modification of the invention, in which dampers are provided on both sides of the bearing support; and Fig. 4 is a transverse section taken on line 4—4 of Fig. 3.

In the following description certain specific terms are used for convenience in referring to the various details of the invention.

In the drawing, Figs. 1 and 2 show a rotatable shaft 10 journaled in a bearing 12 which is mounted in a concentric outer supporting shaft or housing 13. The support 13 may be stationary or it may take the form of a rotating hollow shaft.

The bearing support comprises an outer ring member 14 rigidly mounted on the support or housing 13, a bearing sleeve member 15 rigidly supported by the bearing 12, and a third member or cage consisting of a floating split ring 16 which is restrained only in certain directions with respect to each of the other two members 14 and 15.

The outer ring 14 has two integral diametrically opposed pins 17 and 18 pointing inwardly. Two similar diametrically opposed pins 19 and 20 project outwardly from the bearing sleeve 15 at right angles to the pins 17 and 18 on ring 14. All four of these pins project between the two halves of the floating ring 16 with a free fit.

The floating ring 16, shown as being made in two parts to facilitate assembly, can either rotate or slide axially within limits on the pins of either the outer ring 14 or the bearing sleeve 15. This support prevents substantial rotation of the bearing 12 about the shaft axis with respect to the support 13, and it prevents substantial motion of the bearing in the direction of the shaft axis. However, the bearing is free to move in any direction perpendicular to the shaft axis and to rotate within limits about any axis perpendicular to the shaft axis.

Since the vibrations to be damped are either of translation perpendicular to the axis of shaft 10, or of rotation about an axis perpendicular to the shaft axis, the bearing support allows a limited freedom of motion in the desired directions. Any vibration of either the shaft or the support system may be damped by means of a damping system between the shaft and the support. The fact that the bearing support offers no restraint in the direction of vibration means that all restraint to the vibration as to any expected amplitude thereof is exerted only by the damping system.

In the embodiment of Figs. 1 and 2, the damper comprises a plurality of concentric sleeves 22 mounted on bearing sleeve 15 within the support 13, with suitable clearance between sleeves. Oil under pressure, admitted through a duct 23, fills the spaces between the sleeves. Movement of the bearing forces oil into and out of these spaces, thereby absorbing energy. Suitable packing rings 24 on bearing sleeve 15 provide oil seals.

Figs. 3 and 4 illustrate a modification of the invention which is similar to that previously described except that dampers, shown diagrammatically as dash-pots 25 secured to support 13 and bearing sleeve 15, are provided on each side of the bearing support. In this embodiment, furthermore, the pins 17 and 18 are integral with the tubular support 13.

Although certain specific embodiments have been shown and described herein for purposes of illustration, it will be evident to those skilled in the art that the invention is capable of various other modifications and adaptations within the scope of the appended claims.

What is claimed is:

1. The combination with a rotatable shaft having a given natural frequency of vibration, of a bearing in which said shaft is adapted to rotate, a support for said bearing having a natural vibration frequency different from that of said shaft, a floating ring between said bearing and said support, at least one pin on said support projecting freely into said ring, at least one pin on said bearing projecting freely into said ring, the pins on said support and said bearing being respectively angularly disposed in respect to each other and serving to hold said bearing against substantial rotation in respect to said support about the axis of said shaft, and vibration damping means between said bearing and said support.

2. The combination with a rotatable shaft having a given natural frequency of vibration, of a bearing in which said shaft is adapted to rotate, a support for said bearing having a natural vibration frequency different from that of said shaft, a floating ring between said bearing and said support, an annular series of pins on said support projecting freely into said ring, said pins being equi-angularly disposed about the inside of said support, a second annular series of pins on said bearing projecting outwardly therefrom and freely into said ring, the pins of said second annular series being substantially equi-angularly disposed about said bearing and the pins of one series being substantially symmetrically disposed in respect to those of the other and offset angularly therefrom, so as to prevent substantial rotation of said bearing in respect to said support about the axis of said shaft, and vibration damping means between said bearing and said support.

3. The combination with a rotatable shaft having a given natural frequency of vibration, of a bearing in which said shaft is adapted to rotate, a support for said bearing having a natural vibration frequency different from that of said shaft, a plurality of pins on said support projecting inwardly therefrom, a plurality of pins on said bearing projecting outwardly therefrom, a complementary pair of rings each having semi-circular recesses for freely receiving said pins and arranged when side by side with the recesses cooperating to form substantially cylindrical apertures freely surrounding said pins respectively to prevent substantial rotative movement of said bearing in respect to said support about the axis of said shaft, and vibration damping means between said bearing and said support.

4. The combination with a rotatable shaft having a given natural frequency of vibration, of a bearing in which said shaft is adapted to rotate, a support for said bearing having a natural vibration frequency different from that of said shaft, a floating ring between said bearing and said support, a pair of diametrically opposed pins on said support projecting freely into said ring, a pair of diametrically opposed pins on said bearing at right angles to the pins on said support and projecting freely into said ring, and vibration damping means between said bearing and said support.

5. The combination with a rotatable shaft having a given natural frequency of vibration, of a bearing in which said shaft is adapted to rotate, a support for said bearing having a natural vibration frequency different from that of said shaft, a floating split ring between said bearing and said support, a pair of diametrically opposed pins on said support projecting inwardly between the halves of said split ring, a pair of diametrically opposed pins on said bearing at right angles to the pins on said support and projecting outwardly between the halves of said split ring, and vibration damping means between said bearing and said support.

PAUL J. CAMPBELL.

REFERENCES CITED

The following references are of record in the file of this patent:

UNITED STATES PATENTS

| Number | Name | Date |
| --- | --- | --- |
| 296,754 | Kilburn | Apr. 15, 1884 |
| 513,367 | Parsons | Jan. 23, 1894 |
| 1,606,690 | Bouton | Nov. 9, 1926 |
| 1,740,362 | Mader | Dec. 17, 1929 |
| 1,894,986 | Frins | Jan. 24, 1933 |
| 1,964,140 | Raible | June 26, 1934 |
| 2,068,495 | Lamb | Jan. 19, 1937 |
| 2,327,035 | Gray et al. | Aug. 17, 1943 |
| 2,403,489 | Birmann | July 9, 1946 |